Figure 1:
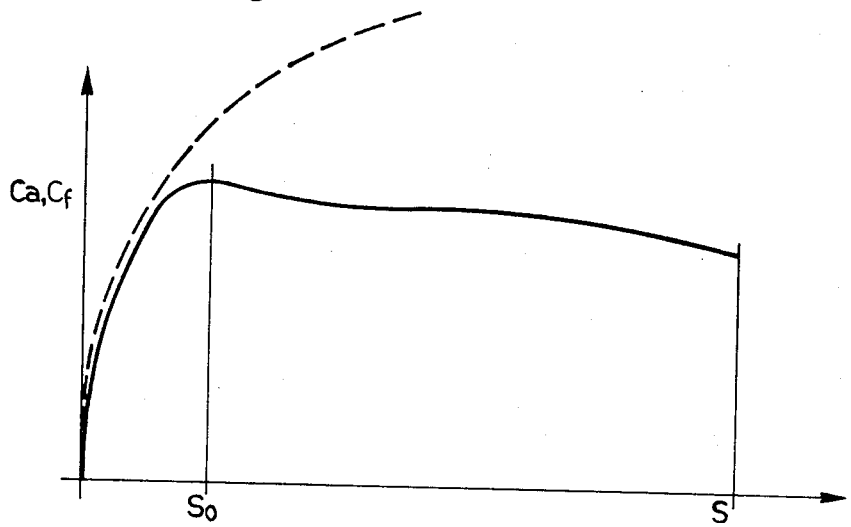

United States Patent [19]

Michellone et al.

[11] 3,713,705
[45] Jan. 30, 1973

[54] ANTISKID BRAKING METHOD AND APPARATUS

[75] Inventors: Giancarlo Michellone; Mario Palazzetti; Giovanni Tabasso, all of Turin, Italy

[73] Assignee: Fiat Societa per Azioni, Turin, Italy

[22] Filed: April 1, 1971

[21] Appl. No.: 130,365

[30] Foreign Application Priority Data

April 7, 1970 Italy.................................68157 A/70

[52] U.S. Cl. ...................................303/21 P, 303/20
[51] Int. Cl. ................................................B60t 8/12
[58] Field of Search ...188/181; 303/20, 21; 324/162; 340/52 R, 262

[56] References Cited

UNITED STATES PATENTS 3,467,444  9/1969  Leiber.................................303/21 B
3,625,572  12/1971  Marouby.........................303/21 BE
3,630,579  12/1971  Rodi.................................303/21 BE
3,554,612  1/1971  Harned............................303/21 BE
3,532,393  10/1970  Riordan..........................303/21 BE Primary Examiner—Trygve M. Blix
Assistant Examiner—Stephen G. Kunin
Attorney—Sughrue, Rothwell, Mion, Zinn & Macpeak

[57] ABSTRACT

A vehicle anti-skid braking system shortens the time required to reduce an excessive slip of the wheel by ascertaining the instant when the wheel acceleration becomes zero after braking pressure has been released and by keeping constant the braking torque on the wheel at the value it reaches after a predetermined time has elapsed from such instant, braking being resumed when the wheel speed has increased by a predetermined amount from the value it had at the instant when the deceleration of the wheel has become zero.

2 Claims, 7 Drawing Figures

ANTISKID BRAKING METHOD AND APPARATUS

The present invention relates to a method of braking vehicles, more particularly automobiles, so as to prevent the wheels from skidding, or anti-skid braking method, which latter more concise expression will be used hereinafter.

The invention also relates to a braking apparatus for carrying the aforesaid method into effect.

Methods of and installations for anti-skid braking of vehicles, more particularly automobiles, are known for instance from other patents and patent applications.

In these systems various problems of the art of antiskid braking are solved or mitigated by reducing the braking torque applied to the brakes to a variable extend tin accordance with various criteria, instead of eliminating this torque altogether as was generally done in the earlier art. These systems however do not make certain that the reduction of pressure is in fact sufficient to remove the wheel from the state of incipient locking which had given rise to the reduction of the braking torque. In limit conditions of the ground, and above all in the case of abrupt variations in the grip coefficient of the ground along the path followed by the vehicle, it may therefore happen that the reduction of the braking torque is not sufficient to re-accelerate the wheel so as to reduce the slip.

In other braking methods and systems, in order to obtain the aforesaid certainty the braking torque is reapplied, after the initial release command, only when it has been ascertained that the retardation of the wheel has in fact ceased. But even these systems suffer from the disadvantage that the subsequent acceleration of the wheel takes place too slowly and therefore the wheel is permitted to remain in dangerous dynamic states (of high slip) for excessively long periods, resulting in reduction of braking efficiency and consequent lengthening of the braking distance.

Lastly, the anti-skid braking systems known hitherto suffer in general from an excessive delay in the re-application of the braking torque after the occurrence of the release command, and in this case also the result is that the braking efficiency is reduced.

A main object of the present invention therefore consists in providing a method of anti-skid braking for vehicles which ensures that in the braking and release cycle the braking torque is restored only after the wheel has positively been removed from the state of incipient locking.

Another object of the invention is to provide a method of anti-skid braking for vehicles in which after the commencement of the reduction of the braking torque the wheel is subjected to accelerating torques of sufficient magnitude to remove the wheel rapidly from the state of incipient locking, so that the time during which the wheel remains in a dangerous dynamic state is reduced to a minimum.

Another object of the invention is to provide a method of anti-skid braking for vehicles which ensures that after the release cycle the braking torque is restored to its normal value sufficiently promptly to avoid excessive reduction of braking efficiency and lengthening of the braking distance.

Another object of the invention is to provide an antiskid braking installation for vehicles which will carry an anti-skid method of the abovementioned type into effect.

The invention achieves the aforesaid and other objects by means of a method of antiskid braking of a vehicle wheel, including the steps of initiating release of braking, allowing the deceleration of the wheel to decrease under friction with the road, ascertaining the instant when the deceleration of the wheel becomes zero, thereafter keeping the braking torque on the wheel constant for a limited interval at the value it reaches after a predetermined time is elapsed from the said instant, and finally initiating resumption of braking, the improvement that the resumption of braking is initiated when the wheel speed has increased by a predetermined amount from the value it had at the instant when the deceleration of the wheel had become zero.

The invention also consists in an apparatus for the antiskid braking of a vehicle wheel, including a braking cylinder for actuating a brake of the wheel, a pressure source for supplying pressure to the brake cylinder through a first normally open solenoid-operated valve, a second normally closed solenoid-operated valve connected between the brake cylinder and exhaust, and means to cause the first valve to close and the second valve to open, the improvement that such means comprises:

a. tachometer means co-operating with the wheel to supply a speed signal,
b. differentiating means connected to the tachometer means to differentiate the speed signal and supply an acceleration signal,
c. a first threshold circuit connected to the output of the differentiating means and supplying, when the acceleration signal exceeds a predetermined negative threshold, a closing command to a set input of a bistable circuit having its output connected to the solenoid of the first valve and an opening command to a set input of a bistable circuit having its output connected to the solenoid of the second valve,
d. a second threshold circuit connected to the output of the differentiating means and supplying, when the acceleration signal passes through zero, a closing command to a reset input of the bistable circuit having its output connected to the solenoid of the second valve, through a delay circuit having a predetermined delay time,
e. a storing circuit connected to the tachometer means and activated by the output of the second threshold circuit to store the value of the speed signal at the instant when the acceleration signal passes through zero, and
f. a comparison circuit having one input connected to the tachometer means and another input connected to the output of the storing circuit and supplying an opening command to a reset input of the bistable circuit having its output connected to the solenoid of the first valve when the difference between its two input signals attains a predetermined value.

Figure 2:
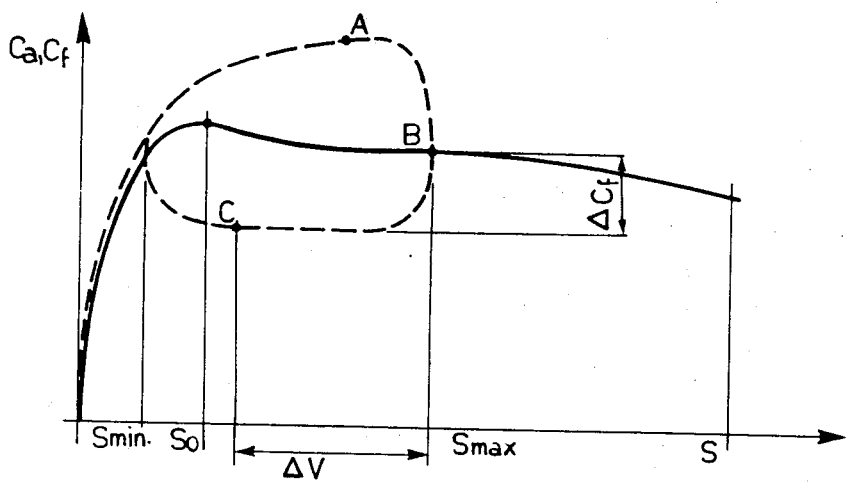
Figure 3:
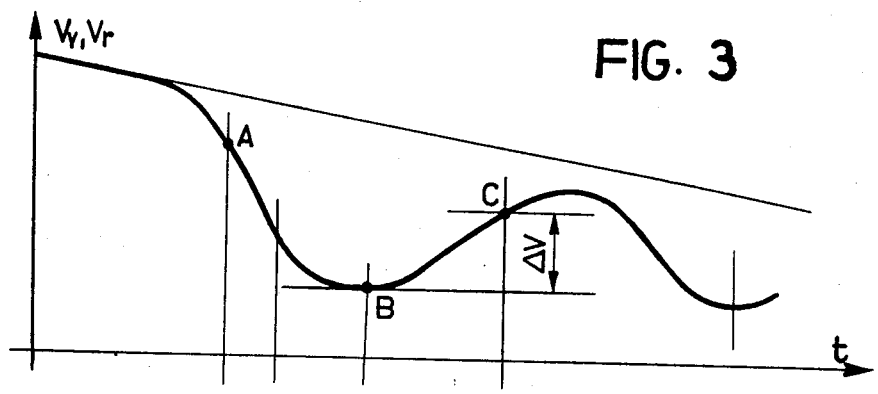
Figure 4:
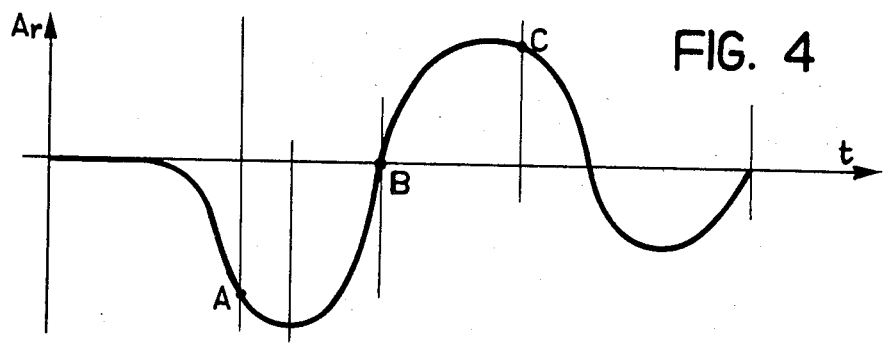
Figure 5:
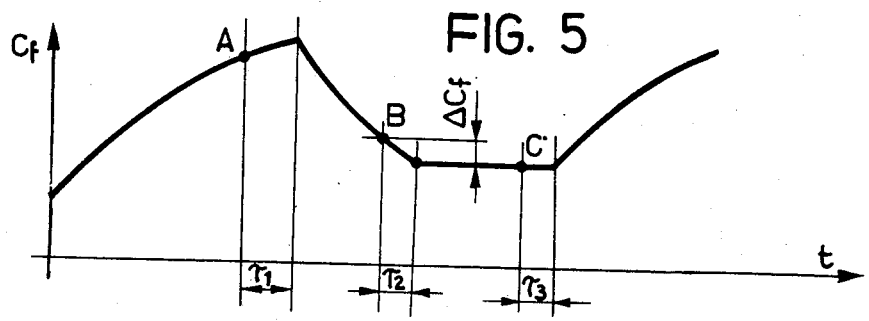
Figure 6:
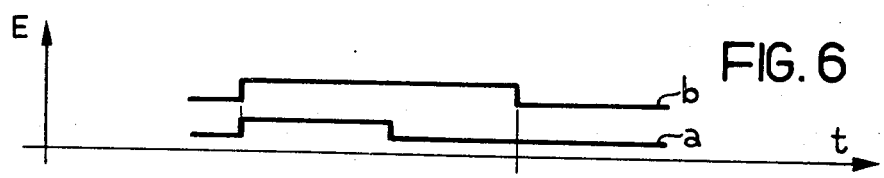
Figure 7:
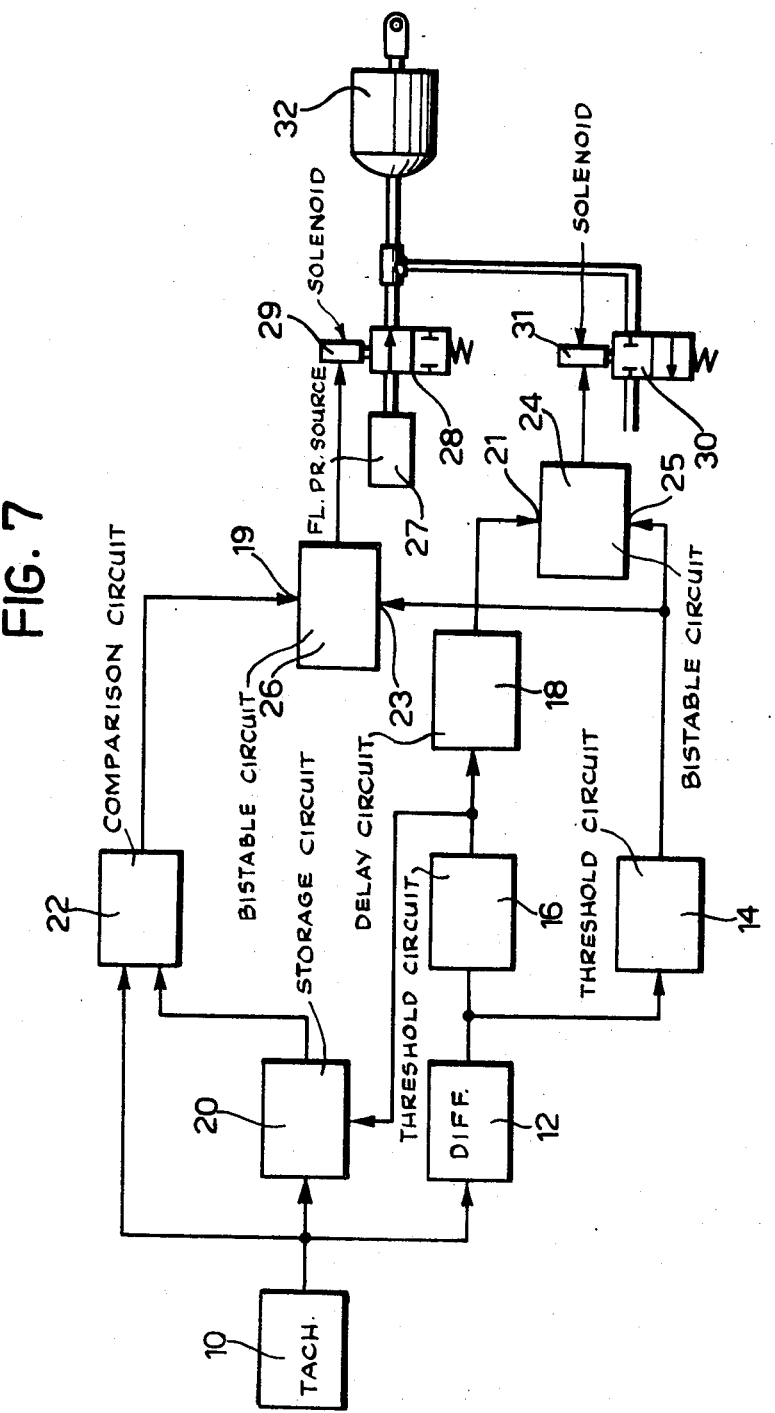

Other objects and advantages of the invention will be made clear by the description of the method of the invention and of a braking installation for carrying this method into effect, which is to be read with reference to the accompanying drawings in which FIG. 1 is a graph showing the variation of the grip torque and of the braking torque on a wheel of a vehicle as functions of the percentage slip of the wheel on the ground, in a conventional braking installation not provided with features that prevent skidding, FIG. 2 is a graph showing the variation of the grip torque and of the braking torque on a wheel of a vehicle as functions of the percentage slip, in accordance with the anti-skid braking method of the invention, FIG. 3 is a graph showing the variation of the speed of the vehicle and of the speed of the wheel as functions of time, when the anti-skid braking method of the invention in used, FIG. 4 is a graph showing the variation of the acceleration of the wheel as a function of time, when the anti-skid braking method of the invention is used, FIG. 5 is a graph showing the variation of the braking torque as a function of time, when the anti-skid braking method of the invention is used, FIG. 6 is a graph showing the variation of the command signals applied to the solenoids of a first and a second electrically operated valve forming parts of an anti-skid braking installation in accordance with the invention, and FIG. 7 shows an anti-skid braking installation in accordance with the invention, partly in the form of an block diagram.

In FIG. 1 the continuous curve shows the law governing the relationship between the grip torque, plotted along the axis of ordinates, and the percentage slip of the wheel, plotted along the axis of abscissae.

The expression "grip torque" means the torque exchanged between the tread of the wheel and the ground, and the expression "percentage slip" means the relative difference between the speed of the vehicle and the instantaneous speed of the wheel, or the expression $$s = (v_v - v_r)/v_v$$

where $v_v$ is the instantaneous speed of the vehicle, and $v_r$ is the instantaneous speed of the wheel.

The curve showing the relationship between grip torque and slip can assume various shapes because it depends on the state of the tire the ground conditions and the speed of the wheel. But although its proportions may vary its general form remains substantially the same under the most varied conditions.

The curve has a first section which is approximately linear, then passes through a maximum corresponding to $s =$ 10 to 25 percent and then descends slowly and finally falls abruptly at slip values close to 100 percent.

The first section of the curve, in which the slip is between 0 and the value $s_0$ corresponding to the maximum value of the grip torque, is called the section of "pseudo-skid" due to the bending of the tread elements subjected to shearing stresses. The maximum value of the grip torque $C_a$ occurs when the tread elements having reached the limit of grip cease to hold, and slide on the ground.

The curve section between the slip value $s_0$ corresponding to the maximum value of the grip torque and unit slip value is called the "skid" section. When $s$ = 100 percent the wheel is locked and complete skidding occurs.

In FIG. 1 also, the curve shown by a broken line represents the variation of the braking torque applied to the wheel in a conventional braking system not provided with features that prevent skidding. The expression "braking torque" means the torque exchanged between the brake shoes and the wheel. The braking torque increases progressively as the slip increases, and the "working point" is displaced from zero along the section of pseudo-skid to the maximum grip torque value, and beyond this if the increase in the braking torque is continued.

The difference between the braking torque and the grip torque represents the inertia torque to which the wheel is subjected in accordance with the relationship $$C_f - C_a = K a_r$$

where
 $C_f$ is the braking torque,
 $C_a$ is the grip torque,
 $a_r$ is the acceleration of the wheel, and
 $k$ is a constant of proportionality related to the moment of inertia of the wheel.

It is clear that when the working point of which the abscissa is $s_0$ is exceeded the inertia torque attains values that cannot be permitted, giving rise to an increasing retardation of the wheel and finally to locking of the wheel.

The function of an anti-skid braking system is to recognize the condition of skidding, that is to say to recognize that the working point has moved to the right of the abscissa $s_0$, in order to reduce the braking torque applied to the wheel, with the object of bringing the working point back into a safer zone.

According to a technique that is now established in the field of anti-skid braking, the command for reduction of the braking torque is given when a predetermined wheel retardation threshold is exceeded. In FIG. 2, the point A indicates the value at which the said release command is given to the braking system. From this point, the braking torque continues to increase for a short time because of the delays in commencement of operation that are inherent in the system, and then falls increasingly rapidly and approaches and finally crosses the grip torque curve.

As stated in the introduction, the hitherto known systems follow various criteria for determining how the system is to behave after the release command. In some cases the braking torque is reduced by a fixed quantity or by a quantity proportional to the value which the braking torque had at the point A. This absolute or proportional reduction is of course predetermined so as to make it relatively certain that the braking torque curve will cross the grip torque curve, so that the retarding inertia torque will thus be eliminated. With these criteria, however, this certainty can only be statistical. Extreme conditions of the ground, in particular an abrupt transition between very different values of the grip coefficient of the ground, can in fact cause an abrupt descent of the grip torque curve, making the anti-skid action of the braking system ineffective and preventing the braking torque curve from reaching the grip torque curve before braking is resumed.

In order to obviate this, other anti-skid braking systems make certain of elimination of the inertia torque, corresponding to a point of intersection of the braking torque and the grip torque curves, and keep the braking torque at the value of that point until the working point has moved to the left of the abscissa $s_0$. It is essential, however, not only to remove the working point from the zone of point B but also to make this removal extremely rapid. It is therefore necessary not only to eliminate the retarding inertia torque applied to the wheel during braking but also to apply to the wheel itself an accelerating torque which will bring it rapidly back into a safer zone of operation, that is to say to the left of the abscissa $s_0$.

In accordance with the invention, therefore, starting from the point B at which elimination of the acceleration of the wheel occurs simultaneously with elimination of the inertia torque to which the wheel is subjected, a command is given for stabilization of the braking torque at a constant value with a time delay such as to ensure the application of an accelerating torque difference $C_a - C_r$ which will rapidly return the wheel to operation in a zone to the left of the abscissa $s_0$.

The introduction of a fixed time delay in the stabilization or "clipping" of the braking torque from the point B onwards is dictated by practical reasons. What is in fact actually desirable is to obtain an accelerating inertia torque, corresponding to the difference in ordinates between the grip torque curve and the braking torque curve, of satisfactory magnitude. However the value of this accelerating inertia torque is not critical and can vary within relatively wide limits provided that it is kept above a minimum value. It is justifiable however, for reasons of economy and structural practicability, to make reference to a time delay rather than a torque difference; the final result will be to obtain an accelerating torque greater than a predetermined value.

It is essential at this point to ensure that braking is resumed, that is to say that restoration of the braking torque applied by the driver of the vehicle by means of the brake pedal is permitted, extremely promptly.

The working point should not in fact move too far to the left of the abscissa $s_0$, because this zone although safe from skid situations is nevertheless ineffective for braking. It is therefore important to give the command for resumption of braking as soon as the slip of the wheel becomes less than the value $s_0$ corresponding to the maximum value of the grip torque.

According to the invention, therefore, this command for resumption of braking is given when speed $v_r$ of the wheel has increased by a fixed absolute amount $\Delta v$ from the value assumed by the speed at the point B, that is to say at the point where the acceleration of the wheel is eliminated. With this criterion, the command for resumption of braking is in all circumstances given at substantially the same point C of the braking cycle shown by the broken line, because on each occasion a substantially constant $\Delta C_f$ is previously applied to the wheel, which therefore accelerates in accordance with a dynamic law which is rigid and practically the same in each case.

With the criterion described above the result is therefore obtained that from the instant of elimination of acceleration of the wheel, corresponding to the point B, the inertia torque applied to the wheel rapidly increases up to a value $\Delta C_f$ which rapidly removes the wheel from the point at which the slip is $S_{max}$ and that the braking torque then begins to increase again promptly, so that the wheel is never permitted to reach a state in which the slip value is less than $S_{min}$, because the command for resumption of braking is applied at a point C which is still to the right of the slip abscissa $s_0$ corresponding to the maximum value of the grip torque.

The course of the anti-skid braking cycle can be better understood with reference to FIGS. 3 and 4. In FIG. 3 the thick curve shows the speed of the wheel as a function of time, whereas FIG. 4 shows the variation of the acceleration of the wheel, also as a function of time, that is to say the derivative of the curve in FIG. 3. The speed $v_v$ of the vehicle is also shown by the thin curve in FIG. 3. The critical points in the cycle are indicated in FIGS. 3 and 4. Point A is the point at which the state of excessive retardation of the wheel is ascertained. After a delay $\tau_1$ inherent in the system, there is a flex in the speed $v_r$ of the wheel, corresponding to a point of minimum acceleration.

Point B corresponds to zero acceleration or minimum speed. After a delay $\tau_2$ which is introduced deliberately as stated above, the braking torque is locked at a constant value which causes progressive restraint of the acceleration of the wheel until the speed of the wheel has increased by a fixed absolute amount $\Delta v_r$; this situation is ascertained at the point C, in order to give a command for resumption of braking whereby the braking torque is increased. The $\Delta v_r$ between points B and C is shown in FIG. 3.

The variation in the braking torque can be followed in FIG. 5, which shows the delay $\tau_2$ introduced in the application of the command for "clipping" the braking torque.

An anti-skid braking apparatus for carrying the anti-skid braking method described above into effect will now be described with reference to FIG. 7.

A tachometer 10 senses the speed of the wheel of a vehicle and applies the speed signal to a differentiator 12 which supplies a wheel acceleration signal as its output. The acceleration signal is transmitted to a first threshold circuit 14 which supplies an output signal, when the input signal exceeds a predetermined negative threshold, for setting a bistable circuit 24 and a bistable circuit 26, through respective setting inputs 23 and 25.

The two voltage steps supplied at the output of the two bistable circuits 24 and 26 as a result of this setting excite the respective solenoids 29 and 31 of two solenoid-operated valves 30 and 28. The electrically operated valve 28, normally open between a fluid pressure source 27 and a brake cylinder 32, closes and ceases to admit pressure to the brake cylinder 32. The solenoid-operated valve 30, normally closed, is opened to exhaust by the signal from the bistable circuit 24 so as to permit discharge of the pressure in the brake cylinder 32. The voltage steps of the bistable circuits 24 and 26 are shown by the curves $a$ and $b$ respectively in FIG. 6.

When the acceleration signal supplied by the unit 12 passes through zero (point B), a second threshold circuit 16 supplies an output signal; through a delay circuit 18 having a predetermined time constant, this output signal resets the bistable circuit 24 on input 21, returning its output to low voltage and thus de-energizing the solenoid-operated valve 30, which closes again and prevents discharge of the pressure still present in the brake cylinder 32. The pressure in the brake cylinders 32 is thus kept substantially constant at the value attained.

The speed signal supplied by the tachometer 10 is also transmitted to a comparison circuit 22 and to a store which when activated by the output signal of the threshold circuit 16 stores the speed signal, that is to say, stores the value of the speed which the wheel has at the point B of the cycle in FIG. 2, and applies this value to the comparison circuit 22, which supplies an output impulse when the two input signals differ by a predetermined quantity. The output impulse of the comparison circuit 22 resets the bistable circuit 26 through its reset input 19, de-energizing the electrically operated valve 28, which re-opens and readmits pressure to the brake cylinder 32.

The braking apparatus described may be constructed either in a hydraulic or a pneumatic form, with suitable modifications known to those skilled in the art. It is also possible to make various changes in the logical circuits, provided that they perform the functions indicated. It is also to be noted that in practice the outputs of the bistable circuits 24 and 26 will be raised by means of suitable amplifiers to a level of power sufficient to excite the electrically operated valves 30 and 28.

What We claim is:

1. In a method of antiskid braking of a vehicle wheel, including the steps of initiating release of braking, allowing the deceleration of the wheel to decrease under friction with the road, ascertaining the instant when the deceleration of the wheel becomes zero, thereafter keeping the braking torque on the wheel constant for a limited interval at the value it reaches after a predetermined time is elapsed from the said instant, and finally initiating resumption of braking at the instant when the wheel speed has increased by a predetermined amount from the value it had at the instant when the deceleration of the wheel had become zero.

2. In an apparatus for the antiskid braking of a vehicle wheel, including a braking cylinder for actuating a brake of the wheel, a pressure source for supplying pressure to the brake cylinder through a first normally open solenoid-operated valve, a second normally closed solenoid-operated valve connected between the brake cylinder and exhaust, and means to cause the first valve to close and the second valve to open, the improvement that such means comprise:

a. tachometer means co-operating with the wheel to supply a speed signal, b. differentiating means connected to the tachometer means to differentiate the speed signal and supply an acceleration signal, c. a first threshold circuit connected to the output of the differentiating means and supplying, when the acceleration signal exceeds a predetermined negative threshold, a closing command to a set input of a bistable circuit having its output connected to the solenoid of the first valve and an opening command to a set input of a bistable circuit having its output connected to the solenoid of the second valve, d. a second threshold circuit connected to the output of the differentiating means and supplying, when the acceleration signal passes through zero, a closing command to a reset input of the bistable circuit having its output connected to the solenoid of the second valve, through a delay circuit having a predetermined delay time, e. a storing circuit connected to the tachometer means and activated by the output of the second threshold circuit to store the value of the speed signal at the instant when the acceleration signal passes through zero, and f. a comparison circuit having one input connected to the tachometer means and another input connected to the output of the storing circuit and supplying an opening command to a reset input of the bistable circuit having its output connected to the solenoid of the first valve when the difference between its two input signals attains a predetermined value.

* * * * *